(12) United States Patent
Yueh

(10) Patent No.: US 8,423,726 B2
(45) Date of Patent: *Apr. 16, 2013

(54) GLOBAL DE-DUPLICATION IN SHARED ARCHITECTURES

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,017

(22) Filed: May 4, 2012

(65) Prior Publication Data

US 2012/0221817 A1    Aug. 30, 2012

Related U.S. Application Data

(63) Continuation of application No. 11/968,048, filed on Dec. 31, 2007, now Pat. No. 8,190,835.

(51) Int. Cl.
*G06F 12/00* (2006.01)
*G06F 13/00* (2006.01)
*G06F 13/28* (2006.01)

(52) U.S. Cl.
USPC ............ 711/154; 711/159; 711/162; 711/170

(58) Field of Classification Search .................. 711/154, 711/159, 162, 170
See application file for complete search history.

(56) References Cited

U.S. PATENT DOCUMENTS

| | | |
|---|---|---|
| 2002/0169934 A1 | 11/2002 | Krapp |
| 2005/0071315 A1 | 3/2005 | Douceur |
| 2008/0005141 A1 | 1/2008 | Zheng |
| 2008/0005201 A1 | 1/2008 | Ting |
| 2008/0294696 A1 | 11/2008 | Frandzel |

OTHER PUBLICATIONS

Neeta Garamella, Understanding and exploiting snapshot technology for data protection, Part 1: Snapshot technology overview, Software Group, IBM Apr. 26, 2006.
Steve Duplessie, Sr. Analyst, Enterprise Strategy Group, "Storage and Information Management Brief", Symantec's Backup Exec 10d, Oct. 11, 2005.

*Primary Examiner* — Christian P Chace
*Assistant Examiner* — Ryan Bertram
(74) *Attorney, Agent, or Firm* — Workman Nydegger

(57) ABSTRACT

Redundant data is globally de-duplicated across a shared architecture that includes a plurality of storage systems. The storage systems implement copy-on-write or WAFL to generate snapshots of original data. Each storage system includes a de-duplication client to identify and reduce redundant original and/or snapshot data on the storage system. Each de-duplication client can de-duplicate a digital sequence by breaking the sequence into blocks and identifying redundant blocks already stored in the shared architecture. Identifying redundant blocks may include hashing each block and comparing the hash to a local and/or master hash table containing hashes of existing data. Once identified, redundant data previously stored is deleted (e.g., post-process de-duplication), or redundant data is not stored to begin with (e.g., inline de-duplication). In both cases, pointers to shared data blocks can be used to reassemble the digital sequence where one or more blocks were deleted or not stored on the storage system.

20 Claims, 8 Drawing Sheets

GLOBAL DE-DUPLICATION IN SHARED ARCHITECTURES

CROSS-REFERENCE TO RELATED APPLICATIONS

This application is a continuation, and claims the benefit, of U.S. patent application Ser. No. 11/968,048, entitled STORAGE OF DATA WITH COMPOSITE HASHES IN BACKUP SYSTEMS, filed Dec. 31, 2007, and incorporated herein in its entirety by this reference.

BACKGROUND OF THE INVENTION

1. The Field of the Invention

The present invention relates to software, hardware, systems and methods for de-duplicating redundant data. More particularly, embodiments of the invention relate to software, hardware, systems, and methods for globally de-duplicating data across a plurality of storage systems implementing traditional copy-on-write snapshot technology or the WAFL file system.

2. The Relevant Technology

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as multimedia files and large databases further increases the quantity of data that is managed. Additionally, this increasingly large data load often requires one or more data protection services, which may include generating backups and performing other operations or services for the data, further increasing the quantity of data being managed.

Snapshots are often implemented in storage systems such as storage arrays and file servers to create static versions of active or original data that can be used for backup and other operations while the active data itself remains available without interruption. Advantageously, some snapshots reduce the quantity of data that must be managed by sharing unchanged original or active data, rather than creating a complete copy of the data. For instance, a copy-on-write snapshot initially copies only the metadata of the active data that points to where the active data is stored into snapshot storage. Before a write is allowed to a block of the active data, the block is copied to the snapshot storage. Read requests to the snapshot of unchanged blocks are redirected to the active data while read requests to blocks that have been changed are directed to the "copied" blocks in the snapshot.

Another snapshot technology that minimizes data can be implemented in a WAFL file system. WAFL file systems utilize an inode tree structure to organize data, with a root inode at the root of the tree. A WAFL snapshot can be created by copying the root inode to a snapshot inode that initially points to the exact same data as the root inode. When a block of the original data is changed, the WAFL file system writes the change to a new storage location without overwriting the old block of data. One or more inodes beneath and/or including the root inode can be modified to point to the changed block. Other than changed blocks, however, both the root inode and the snapshot inode point to the same blocks of data that are shared between each.

In addition to minimizing storage requirements in a storage system by sharing unchanged data between a root inode and snapshot inodes, the WAFL file system has further been extended to identify and eliminate redundant data blocks beneath the root inode within a storage system.

Notwithstanding the data reduction obtained by implementing copy-on-write and WAFL technologies, these solutions fail to reduce redundant data stored in snapshots (and in active data in the case of conventional copy-on-write) and can only be applied to individual storage systems and not globally across storage systems.

The subject matter claimed herein is not limited to embodiments that solve any disadvantages or that operate only in environments such as those described above. Rather, this background is only provided to illustrate one exemplary technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
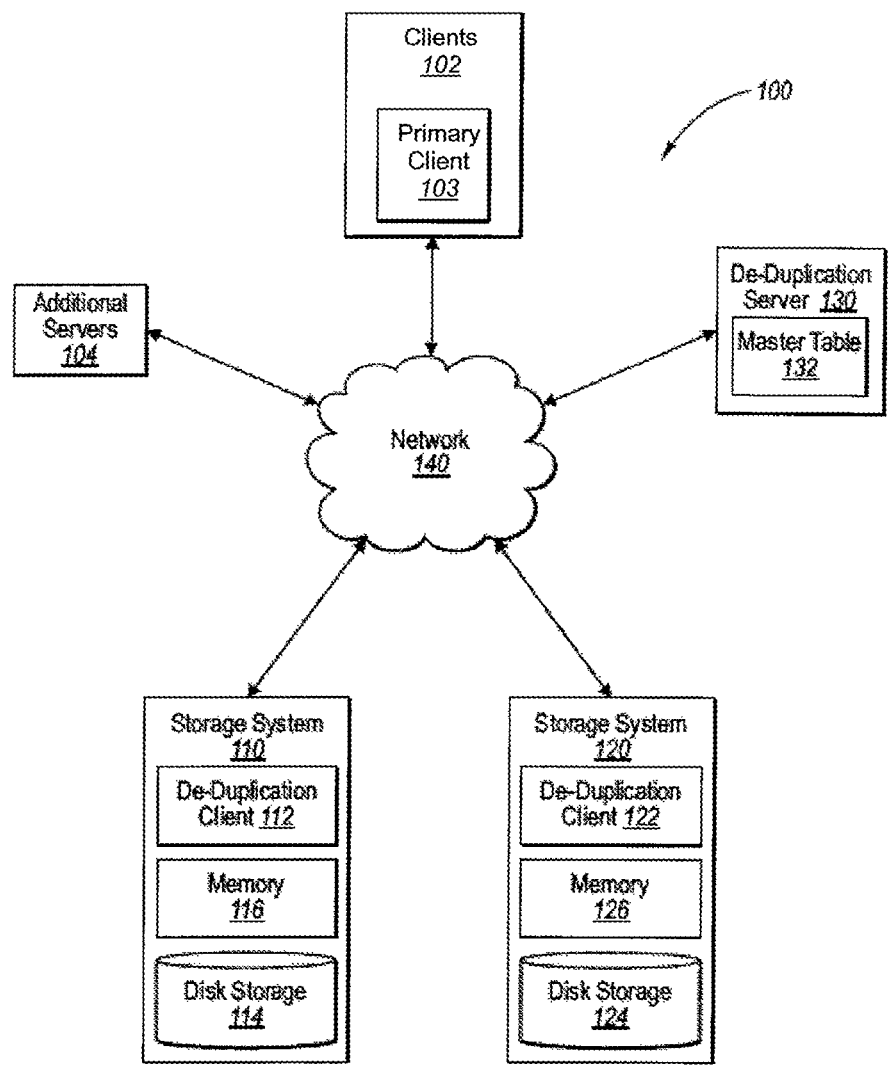
FIG. 1 illustrates one embodiment of a shared storage system architecture in which embodiments of the invention can be implemented.

Reference will no be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention is directed to methods and systems for globally de-duplicating redundant data across a plurality of storage systems in a shared storage architecture. The storage systems can implement traditional copy-on-write snapshot technology and/or the WAFL file system to create snapshots of data or other back-up technologies. A de-duplication client is typically installed on each storage system and maintains a hash table or other index of the data stored on the corresponding storage system. In one embodiment, the hash table and/or content thereof are reported to a de-duplication server that maintains a master hash table of all the data on all of the storage systems in the shared architecture.

Each de-duplication client identifies duplicate data and releases it out of (or prevents it from being stored on) a corresponding storage system, to be replaced by a pointer or other reference pointing to a single instance of the data stored on any of the storage systems in the architecture. For instance, a de-duplication client may break a file into blocks and hash each block. The de-duplication client compares the hash for each block to the hash table maintained by the de-duplication client. If a new hash is identical to an existing hash in the hash table, the data corresponding to the new hash can be released out of the storage system and the de-duplication client can replace the data with a pointer to a single instance of the data already stored on the storage system. Where the WAFL file system is used, this may include changing an inode to point to a single instance of the data already on the storage system.

If a new hash is different from hashes in the hash table, the de-duplication client adds the new hash to the hash table, and communicates with the de-duplication server to determine whether the data is stored on a different storage system. For instance, the de-duplication client may send the de-duplication server the new hash. The de-duplication server checks the new hash against the master hash table. If the new hash is identical to a hash already in the master hash table, indicating that the corresponding data is already stored on one of the plurality of storage systems, the de-duplication server sends the location of the corresponding data to the de-duplication client. The de-duplication client releases out the duplicate data and stores a pointer or reference to a single instance of the data already stored on a different storage system. The de-duplication client may also update its hash table with the location of the data corresponding to the new hash just added to the hash table.

If the new hash is different from the existing hashes in the master hash table, indicating that the corresponding data is not stored on any of the plurality of storage systems, the de-duplication server stores the new hash in the master hash table, along with the location of the corresponding data on the storage system. The de-duplication server informs the de-duplication client that the corresponding data is not a duplicate and the de-duplication client stores the data in the storage system. The de-duplication client can update its hash table with the location of the data in the storage system.

The de-duplication clients may perform de-duplication inline or post-process. Additionally, each de-duplication client can be configured to perform de-duplication on storage memory as well as on particular volumes, files, directories, and the like or any combination thereof, within each corresponding storage system. Further, the de-duplication clients can be implemented in hardware (e.g., FPGA, ASIC, and the like), software, or any combination thereof.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained.

With reference now to FIG. 1, an example shared architecture or computer system 100 is described in which embodiments of the invention can be implemented. The system 100 is illustrated in simplified block form and is intended to represent a distributed network of computer systems/devices that generate digital data that is stored on a plurality of storage systems 110, 120. Redundant data stored across storage systems 110, 120 can be reduced and/or eliminated through the use of de-duplication server 130 and de-duplication clients 112, 122 installed on each storage system 110, 120. Although illustrated with only two storage systems 110, 120, the system 100 may alternately include three or more storage systems.

The inventive methods described herein may apply to any type of special-purpose or general purpose computers embodied as storage systems. Examples of storage systems include file servers, filers, and storage arrays. Moreover, the teachings of this invention can be adapted to a variety of storage system architectures including, but not limited to, a network-attached storage environment and a storage area network. The term "storage system" should therefore be taken broadly to include such arrangements.

As shown, the system 100 includes one or more client nodes 102 such as desktops, laptops, or the like and may also include one or more additional servers 104, such as email servers, backup servers, print servers, and the like. The client nodes 102 and or additional servers 104 generate data that can be stored on the storage systems 110, 120 and can also access/read data already stored on the storage systems. The client nodes 102, additional servers 104, storage systems 110, 120, de-duplication server 130, and additional servers can communicate with each other via a network 140 that may comprise a LAN, a WAN, the Internet, a VPN, or other wired and/or wireless digital communications network.

Each storage system 110, 120 includes, in addition to a de-duplication client 112, 122, disk storage 114, 124, for the persistent/long-term storage of data and memory 116, 126 for the volatile/short-term storage of data.

The storage systems 110, 120 include software and/or hardware for generating snapshots of original data in storage 114, 124 that can be used as guides for restoring the storage systems in the event that they fail. As used herein, a "snapshot" refers to a point-in-time copy of the original data or to data that permits the reconstruction of data at a particular point in time. Typically, snapshots are made available for other applications such as data protection, data analysis and reporting, and data replication applications. The original copy of the data continues to be available to the applications without interruption, while the snapshot copy is used to perform other functions on the data.

According to one embodiment of the invention, the storage systems 110, 120 generate snapshots of original data using copy-on-write. In this case, the snapshot is created by initially copying only metadata about where the original data is stored. Thereafter, the snapshot tracks changes to the original data as writes to the original data are performed. This is illustrated for a file on the storage system 110 in FIGS. 2A and 2B, although a snapshot can be taken of a file, a directory, an entire volume, and the like.

Figure 2A:
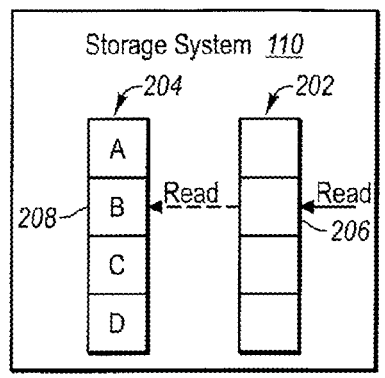
FIGS. 2A and 2B illustrate a method for creating a snapshot of original or active data using copy-on-write technology.

In FIG. 2A, a snapshot 202 of a file 204 is created by reserving space in the storage 114 of the storage system 110 and copying the metadata for the file 204 to the snapshot 202. As shown, no changes have been made to the file 204 since creating the snapshot 202. Consequently, a read request to any block of the snapshot that is unchanged relative to the original file, such as block 206 of the snapshot 202, is redirected to the corresponding block (e.g., block 208) of the original file 204.

Figure 2B:
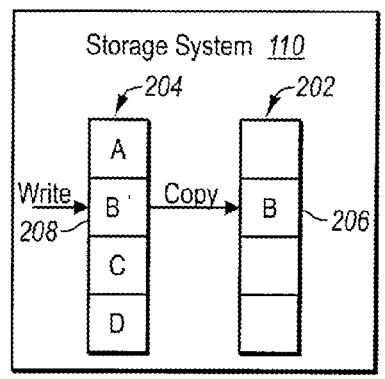

FIG. 2B illustrates the changes that occur when the original file 204 is modified. As shown, the storage system 110 receives a write request to block 208 of the original file. Before the write is allowed to block 208, copy-on-write copies the content of the original data block 208 to the corresponding snapshot data block 206. Thereafter, the new content of the write request is written to the original file 204. This keeps the snapshot consistent with the exact time the snapshot was taken. Read requests into the snapshot copy 202 for the changing data are satisfied from the snapshot while read requests into the snapshot copy 202 for unchanging data are redirected to the original file 204.

According to another embodiment of the invention, the storage systems 110, 120 generate snapshots of original data using the WAFL file system. The WAFL file system can be thought of as a tree of blocks rooted by a root inode. Each of the storage systems 110, 120 has a root inode. The root inode describes an inode file that contains the inodes that describe the rest of the files in the storage 114, 124 of the storage system 110, 120, including a block-map file and inode-map file. The inode files ultimately point to data blocks that make up the inode files. Depending on the size of an inode file, there may be various layers of indirection between an inode file and the actual data blocks of the inode file.

Figure 3A:
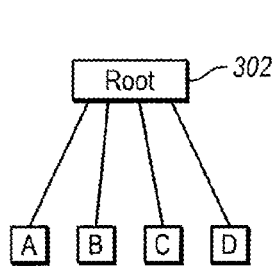
FIGS. 3A, 3B, and 3C illustrate a method for creating a snapshot of original or active data in a WAFL file system.
Figure 3B:
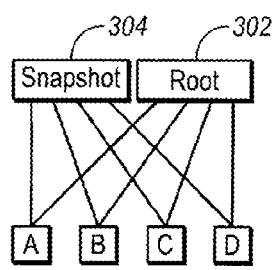
Figure 3C:
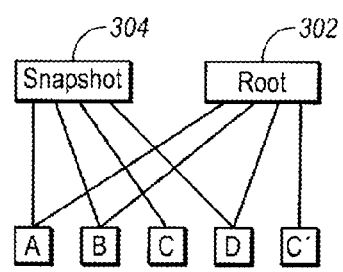

To create a snapshot of this tree of blocks, WAFL duplicates the root inode and changes the data blocks that an inode points to if the data blocks are changed. FIGS. 3A through 3C illustrate, in a simplified form that leaves out internal nodes, how this works.

In FIG. 3A, a root inode 302 is shown pointing to data blocks A, B, C and D. In FIG. 3B, a snapshot 304 is generated by duplicating the root inode 302. The snapshot is a duplicate inode that becomes the root of a tree of blocks corresponding to the snapshot. When the snapshot 304 is first created, it points to the same data blocks as the root inode 302.

In FIG. 3C, a user modifies data block C to new data block C' and WAFL writes the new data block C' to storage. WAFL additionally changes the root inode 302 (and/or one or more inodes between the root inode and the data block) to point to the new data block C'. However, the snapshot 304 still points to the original data block C which has not been changed/modified.

Advantageously, both WAFL and copy-on-write snapshots minimize storage requirements in a storage system by not copying unchanged data blocks for snapshot copies of original data. Thus, even though both the original copy of data and a snapshot copy include one or more identical data blocks, only a single instance of the one or more identical data blocks is stored in a storage system. Embodiments of the invention extend the ability to utilize a single instance of data for original data and snapshots across a plurality of storage systems, described in more detail below.

Returning to FIG. 1, the de-duplication server 130 maintains a master hash table or index 132 of the data stored by the plurality of storage systems in the system 100. In one embodiment, the master hash table 132 includes hashes or digital signatures of data blocks that have been processed by de-duplication clients 112, 122. Each hash or digital signature corresponds to a directory, file, data block, and the like or any combination thereof, stored on one of the plurality of storage systems. The master hash table 132 additionally indicates the locations of each corresponding directory, file, data block, or the like. As will be described in more detail below, the de-duplication server 130 and master hash table 132 enable de-duplication across the plurality of storage systems, although they are not required in all embodiments of the invention.

The de-duplication server 130 receives the information for the master hash table 132 from the de-duplication clients 112, 122. The de-duplication clients 112, 122 can be implemented in hardware (e.g., FPGA, ASIC, and the like), software, or a combination of hardware and software. In some embodiments of the invention, the de-duplication clients 112, 122 process all of the data in the corresponding storage systems for de-duplication. In other embodiments, an administrator or other user can define and/or set policies in the de-duplication clients 112, 122 that limit de-duplication to a subset of the data on a corresponding storage system. For instance, de-duplication can be limited on a storage system to one or more volumes, directories, files, and the like or any combination thereof. The policies can also depend on whether data blocks reside in a cache or memory of a storage system.

In one embodiment of the invention, the clients 102 may include a primary client 103. The primary client 103 can also perform de-duplication, similar to the de-duplication clients 112, 122. The primary client 103 could be a storage driver "client." Similar to the de-duplication clients 112, 122 in one embodiment, the primary client 103 can do most of the de-duplication and routing locally, depending on the size of a local cache implemented at the primary client 103 for performing de-duplication. The primary client 103 may be implemented in one or more primary servers, network switches, and the like or any combination thereof.

Figure 4:
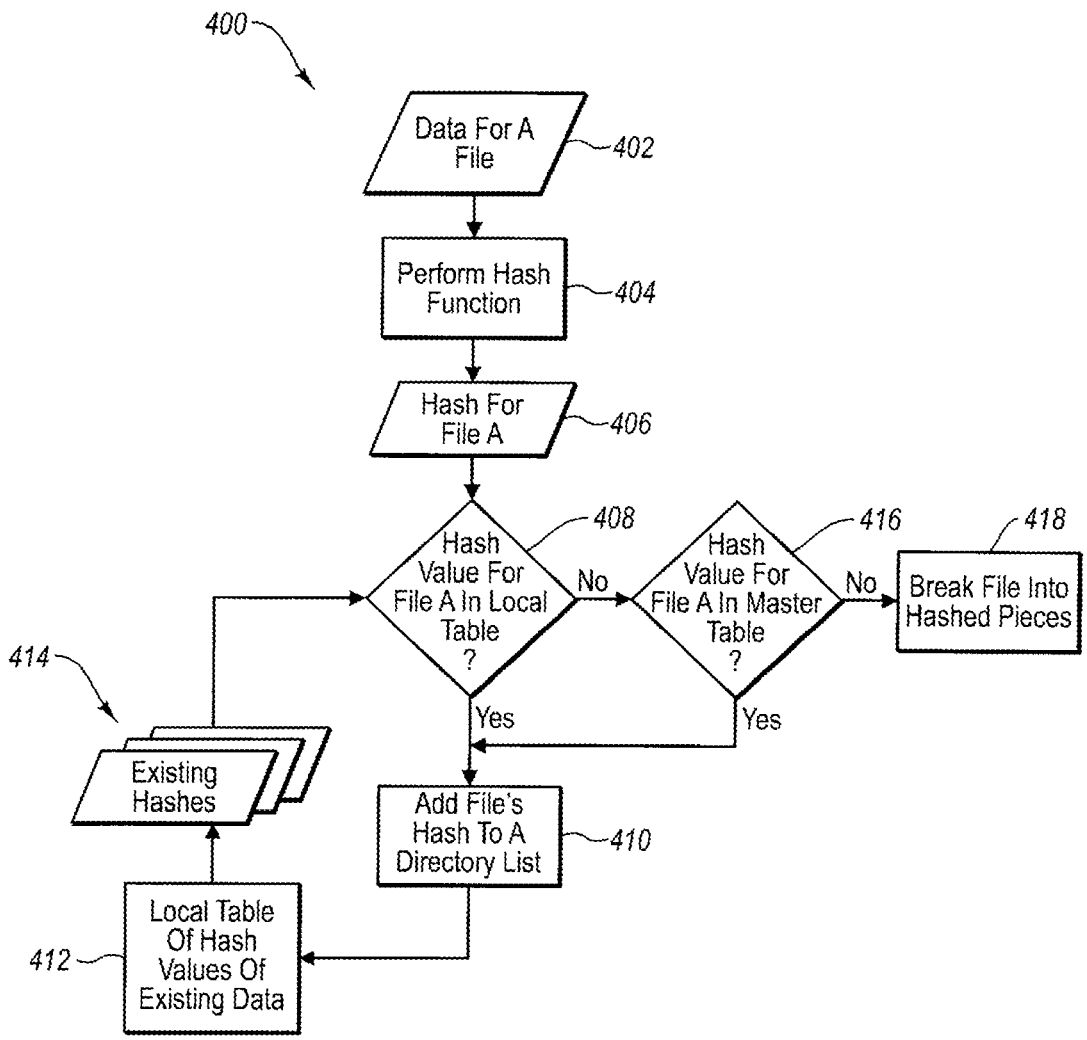
FIG. 4 is a logic flow chart depicting a process for de-duplicating a file or other digital sequence.

A de-duplication client de-duplicates redundant data stored on (or being written to) a storage system by identifying redundant data, deleting the redundant data (or preventing it from being stored to begin with), and storing a pointer or reference to a single instance of the data. FIG. 4 is a logic flow chart depicting a process 400 for de-duplicating a file or other digital sequence 402. The process 400 may be performed by the de-duplication clients either inline or post-process. In the first case, the de-duplication client performs the process 400 when a write request is received at a storage system to store File A 402. In the second case, the de-duplication client performs the process 400 after File A has already been stored in the storage system.

The process 400 begins with a de-duplication client performing 404 a hash function on File A to obtain a hash value (or "hash") 406 of File A. In the present embodiment, the process is performed by the de-duplication client 112 on storage system 110. Note, however, that the process 400 may be performed by any of the de-duplication clients on any of the plurality of storage systems in the system 100. The de-duplication client 112 uses the hash value to determine 408 whether File A is already stored on the storage system 110. This may include comparing the hash 406 to a local hash table 412 maintained by the de-duplication client 112 on the storage system 110. The local hash table includes hashes 414 of data existing on the storage system 110 and pointers to the corresponding data. In some instances the hash values themselves point to the corresponding data in the storage system 110.

If the hash value 406 of File A is already in the local hash table, this indicates that File A is already stored in the storage system 110 and a redundant instance of the file need not be stored on the storage system 110. Thus, the file's hash value is added 410 to a hash recipe or directory list and used to point to the single instance of File A already stored on the storage system 110. This hash recipe generally includes, in one embodiment, the data and associated structures needed to reconstruct a file, directory, volume, or entire system depending on the class of computer file data entered into the system. On the other hand, if the hash value for File A is not in the local hash table 412, the de-duplication client 112 queries the de-duplication server 130 to determine 416 if the file is stored on a different storage system in the system 100. This may include sending the hash of File A to the de-duplication server so that the de-duplication server can compare the hash of File A to the hashes stored in the master table 132 of data existing in the plurality of servers in the system 100.

If the hash value of File A is in the master hash table 132, the de-duplication server 130 can respond to the query by indicating that File A is a duplicate and indicating where File A is stored in the system 100. The de-duplication client 112 can then add the file's hash value to the hash recipe and a pointer to the single instance of File A stored on the different storage system. If the hash value of File A is not in the local hash table or the master hash table, the file is broken into hashed pieces (as will be more fully described with respect to FIG. 5) at step 418 to de-duplicate the file at a sub-file level.

The use of a hash recipe or directory list is used in one embodiment in storage systems that generate snapshots using copy-on-write and lack a WAFL or other inode-based file system. In a WAFL file system, however, the use of hash recipes and directory lists may be unnecessary and the process 400 can be modified accordingly. Much of the process 400 would be the same, including hashing 404 a file and comparing it 408, 416 to existing hashes in the local hash table 412 and/or master hash table 132. However, when it is determined that a file is already stored in the system 100 on the same or a different storage system, step 410 may comprise modifying the inode of File A to point to the single instance of File A, wherever it may be.

Figure 5:
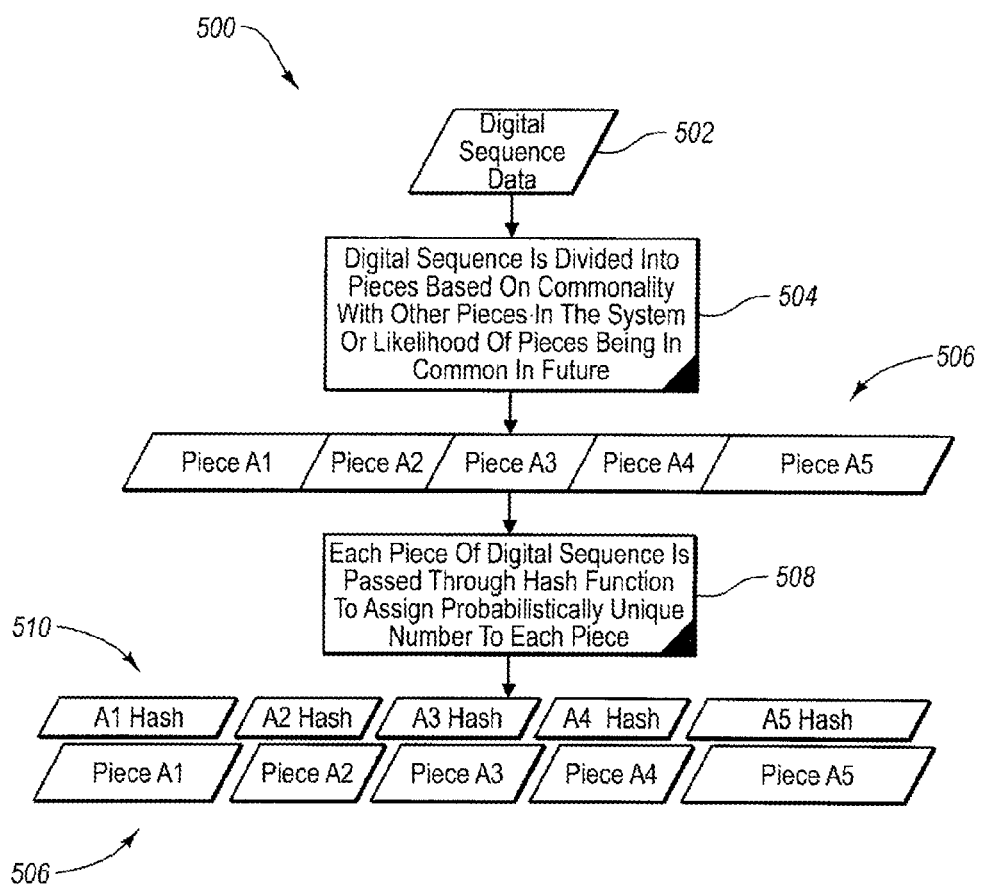
FIG. 5 is a logic flow chart depicting a process for breaking up a file or other digital sequence into a plurality of blocks or pieces.

With additional reference to FIG. 5, a further logic flow chart is provided depicting steps in a process 500 for breakup of a digital sequence (such as the File A) that may be performed by the de-duplication client 112 in order to de-duplicate a file or other digital sequence at a sub-file or block level. The file data 502 is divided 504 into blocks or pieces based on commonality with other pieces in the system 100 or the likelihood of pieces being found to be in common in the future. In one embodiment, the de-duplication client 112 divides 504 the file into pieces using the "sticky byte" algorithm, disclosed in U.S. Pat. No. 6,704,730, filed Feb. 5, 2001 and entitled HASH FILE SYSTEM AND METHOD FOR USE IN A COMMONALITY FACTORING SYSTEM, which patent is herein incorporated by reference in its entirety. The result of step 502, in the representative example shown, is the production of five file pieces 506 denominated A1 through A5 inclusively. Each of the file pieces 506 is individually hashed 508 to assign a probabilistically unique number to each of the pieces 506. Thus, as shown, each of the file pieces 506 has an associated, probabilistically unique hash value 510 (shown as A1 Hash through A5 Hash, respectively).

Alternately, a file or other digital sequence can be broken up into pieces using one or more algorithms other than the one described above. In this case, the digital sequence can be broken into pieces or blocks of data of a fixed or variable size. Alternately, it may not be necessary to break data into pieces where the data is already stored in blocks. For instance, the WAFL file system stores data in 4 KB blocks and the de-duplication client 112 can hash these preexisting blocks without performing the method 500 of FIG. 5.

Figure 6:
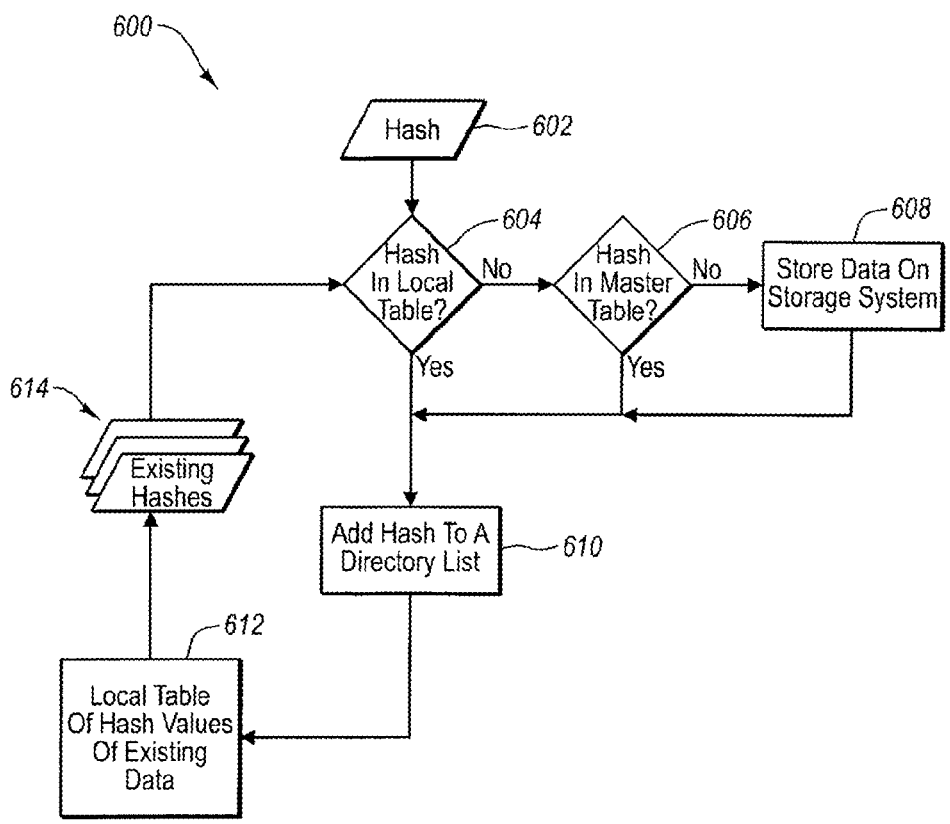
FIG. 6 is a logic flow chart depicting a method of identifying redundant data blocks across a plurality of storage systems.

With additional reference to FIG. 6, another logic flow chart is shown depicting a method 600 of de-duplicating a file or other digital sequence at a sub-file or block level. The method 600 uses a hash value 602 of a block or piece of data to determine whether the block or piece of data has been previously stored in any of the plurality of storage systems or storage arrays of a system 100. The hash value 602 may correspond to one of the hash values 510 of FIG. 5. The de-duplication client 112 first uses the hash value 602 to determine 604 whether the corresponding piece or block of data is already stored on the storage system 110, which may include comparing the hash 602 to existing hashes 614 in the local hash table 612. The local hash table 612 corresponds in this embodiment to the local hash table 412 of FIG. 4.

If the hash value 602 of the piece of data is already in the local hash table, the hash value is added 610 to a hash recipe, and the piece of data is not stored redundantly on the storage system 110. If the hash value 602 of the piece of data is not in the local hash table, the de-duplication client 112 queries the de-duplication server 130 to determine 606 whether the piece of data is stored on a different storage system.

If the hash value 602 of the piece of data is already in the master hash table, the de-duplication client is informed by the de-duplication server of the location of the piece of data, the hash value is added 610 to a hash recipe, and the piece of data is not stored again in the system 100. If the hash value of the piece of data is not in the master hash table or the local hash table, the de-duplication client is informed by the de-duplication server that the piece of data is new and the de-duplication client 112 permits the piece of data to be stored 608 on the storage system 110. The de-duplication client 112 may additionally add 610 the hash value of the new piece of data to a hash recipe.

Just as with the method 400 of FIG. 4, the method 600 can be adapted if the storage system 110 implements a WAFL file system. In this case, step 610 may instead comprise modifying/creating inodes to point to the piece of data, whether the piece of data was previously stored on the storage system 110, previously stored on a different storage system in the system 100, or is an entirely new piece of data.

One skilled in the art will appreciate that embodiments of the methods 400 and 600 of de-duplicating data do not require a de-duplication server 130. For instance, rather than querying a server with a hash to determine whether a corresponding file or piece of data exists in the system 100, a de-duplication client on one storage system can individually query each of the de-duplication clients on the other storage systems in the system with the hash, and the de-duplication clients can check the hash against their respective local hash tables. Alternately or additionally, each de-duplication client can maintain a master hash table of the entire system 100.

Figure 7:
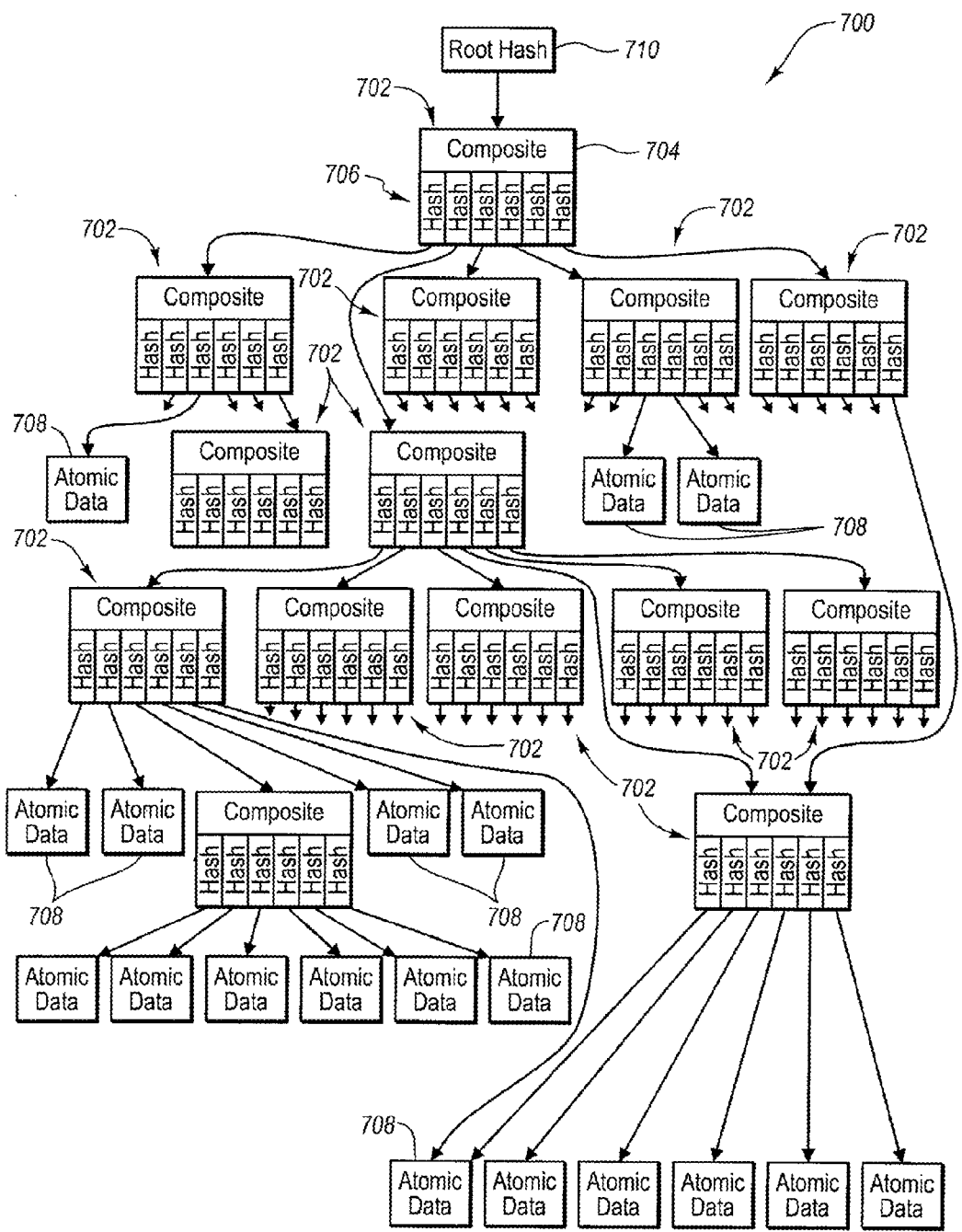
FIG. 7 is a conceptual representation of one embodiment of a method for organizing data to optimize the reutilization of redundant sequences.

With reference additionally now to FIG. 7, a conceptual representation 700 is shown of how a hash file system and method may be utilized to organize data 702 to optimize the reutilization of redundant sequences through the use of hash values 706 as pointers to the data they represent and wherein data 702 may be represented either as explicit byte sequences (atomic data) 708 or as groups of sequences (composites) 704. The representation 700 illustrates the tremendous commonality of recipes and data that gets reused at every level.

The basic structure of the hash file system of the present embodiment is essentially that of a "tree" or "bush" wherein the hash values 706 are used instead of convention pointers. The structure 700 is not unlike the inode tree structure of a WAFL file system. However, rather than inodes, the structure 700 uses hash values 706 in recipes to point to data or another hash value that could also itself be a recipe. In essence, then, recipes can point to other recipes that point to still other recipes that ultimately point to some specific data, eventually getting down to nothing but data. In some embodiments, the hash file system conceptually represented in FIG. 7 is not implemented in storage systems using the WAFL file system.

Figure 8A:
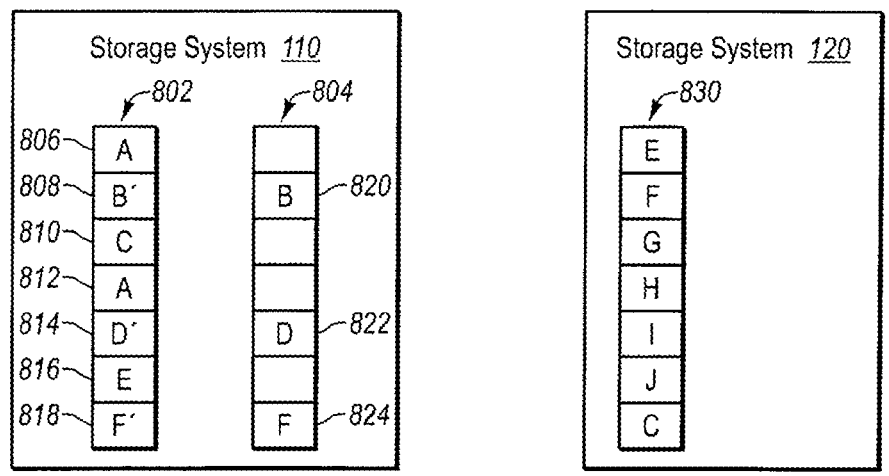
FIGS. 8A and 8B illustrate one implementation of global de-duplication for original data and copy-on-write snapshot data across a plurality of storage systems.
Figure 8B:
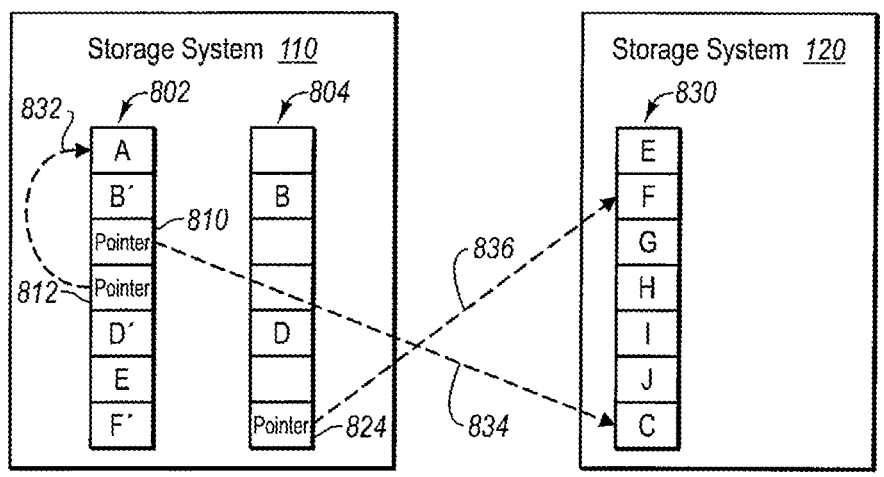

With additional reference to FIGS. 8A and 8B, one implementation of global de-duplication across storage systems 110, 120 is illustrated for storage systems that create copy-on-write snapshots. Prior to data de-duplication (FIG. 8A), the storage system 110 includes original data 802 and at least one previously taken snapshot copy 804 of the original data. As shown, blocks 808, 814 and 818 have been modified since the snapshot 804 was taken. The storage system 120 includes original and/or snapshot data 830.

To de-duplicate redundant data in the storage system 110, the de-duplication client 112 is operated to process the original 802 and/or snapshot data 804. For instance, if the original data 802 comprises a file, the de-duplication client 112 may perform the method 400 of FIG. 4 to determine if the file is stored anywhere in the system 100. Alternately or additionally, the de-duplication client 112 may perform the method 500 of FIG. 5 to break the original data 802 and/or snapshot 804 into blocks or pieces. Afterwards, the de-duplication client may perform the method 600 of FIG. 6 to determine whether each of the blocks of data (original and snapshot) is stored anywhere in the system 100.

For instance, the de-duplication client may break the original and snapshot data 802, 804 into the blocks shown and perform a hash function on each block. The de-duplication client can then compare the hash for each block to its local table of hash values to de-duplicate data locally and/or can query the de-duplication server to compare the hashes to the master hash table to de-duplicate data globally.

The results of performing these steps and methods are depicted in FIG. 8B. In particular, the de-duplication client 112 identified blocks 810, 812, and 824 as being redundant data blocks and released these data blocks out of the storage system 110, which results in free space on the storage system 110. Alternately, the de-duplication client can identify redundant blocks and prevent them from being stored in the first place using inline de-duplication. The de-duplication client 112 additionally modifies hash recipes or directory lists for the original data 802 and snapshot 804 to point to the corresponding data. Consequently, read requests into the storage system for any of the released out blocks 810, 812, 824 can be redirected to the corresponding data, wherever it is stored in the system 100, as illustrated by the lines 832, 834, and 836.

Figure 9A:
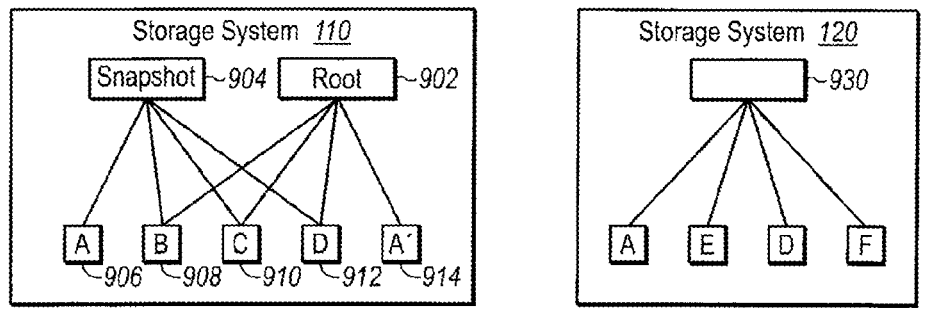
FIGS. 9A and 9B illustrate one implementation of global de-duplication for original data and WAFL snapshot data across a plurality of storage systems.
Figure 9B:
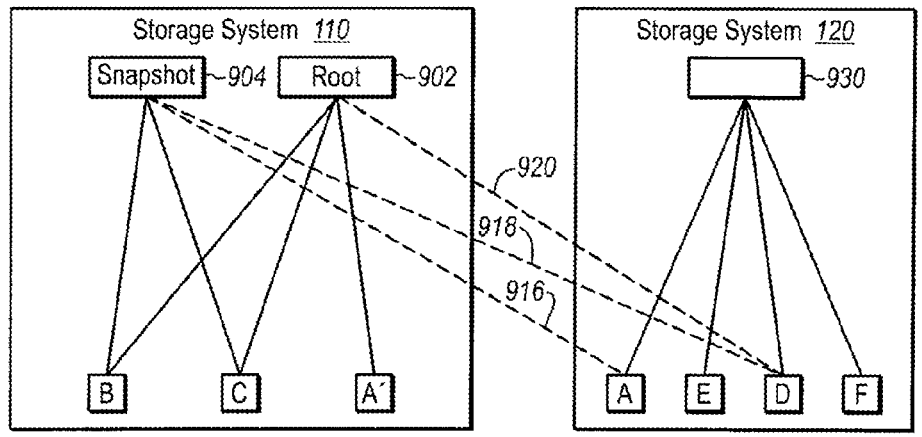

With additional reference to FIGS. 9A and 9B, one implementation of global de-duplication across storage systems 110, 120 is illustrated for storage systems that implement the WAFL file system. Prior to data de-duplication (FIG. 9A), the first storage system 110 includes original data represented by root inode 902 and at least one previously taken snapshot copy of the original data represented by snapshot inode 904. Similar to FIGS. 3A-3C above, in FIGS. 9A and 9B there may be various layers of indirection (not illustrated) between an inode file and the actual data blocks of the inode file. As shown, block 906 has been modified since the snapshot 904 was taken and the root inode 902 no longer points to it, pointing instead to modified block 914. The second storage system 120 includes one or more root and/or snapshot inodes represented herein by inode 930.

To de-duplicate redundant data in the storage system 110, the de-duplication client 112 processes the data on the storage system as discussed above with respect to FIGS. 4-6. For instance, the de-duplication client 112 may perform the method 400 of FIG. 4 to identify and release out redundant files on the storage system 110. Alternately or additionally, the de-duplication client 112 may perform the method 500 of FIG. 5 to break original data and/or snapshot data into blocks or pieces that can be hashed. Where operating on a WAFL file system, data is already stored in fixed-size blocks and the de-duplication client can hash the pre-existing blocks without breaking the data into pieces. Alternately or additionally, the pre-existing blocks can be broken into even smaller blocks or pieces that are hashed. Afterwards, the de-duplication client may perform the method 600 of FIG. 6 to determine whether each of the blocks of data (original and snapshot) is stored anywhere in the system 100.

For instance the de-duplication client can perform a hash function on each of the blocks of data 906, 908, 910, 912, and 914. The de-duplication client can then compare the hash for each block to its local table of hash values to de-duplicate data locally and/or can query the de-duplication server to compare the hashes to the master hash table to de-duplicate data globally.

The results of performing these steps and methods are depicted in FIG. 9B. In particular, the de-duplication client 112 identified blocks 906 and 912 as being redundant data blocks and released these data blocks out of the storage system 110, which results in free space on the storage system 110. Alternately, the de-duplication client can identify redundant blocks and prevent them from being stored in the first place using inline de-duplication. The de-duplication client 112 additionally modifies one or more inodes to point to the corresponding data. Consequently, read requests into the storage system 110 for any of the released out blocks 906, 912 can be redirected, as shown by the dotted lines 916, 918, and 920, to the corresponding data, wherever it is stored in the system 100. Note that while FIGS. 9A and 9B only illustrate global de-duplication across storage systems with WAFL file systems, local de-duplication within a storage system can also be accomplished using the methods and systems described herein.

One of skill in the art will appreciate, with the benefit of the present disclosure, that data can be globally de-duplicated across storage systems that jointly implement both WAFL and copy-on-write technologies. Alternately or additionally, global de-duplication across storage systems can be implemented in storage systems that don't implement either WAFL or copy-on-write snapshot technologies at all. Alternately or additionally, global de-duplication can be implemented with storage processes such as business continuance volumes ("BCVs", also referred to as business copy volumes).

As previously mentioned above, embodiments of the invention advantageously reduce the amount of storage required to store data in a shared architecture by globally de-duplicating data across a plurality of storage systems. Additionally, embodiments of the invention can improve performance.

For instance, consider a system that includes a plurality of virtual machines (or other files) stored across two or more storage systems. In a conventional system, each virtual machine, including executables, dll's, and other data that is identical from virtual machine to virtual machine (e.g., redundant data) is stored in the storage systems and takes up storage capacity. According to embodiments of the invention, however, a single instance of the redundant data can be shared by all of the virtual machines by configuring hash recipes or inodes for each virtual machine to point to the single instance of the data. This can significantly increase the storage capacity of the storage systems since redundant data is not stored.

In addition, the performance of the storage systems can be improved when responding to read requests. When a storage system receives a read request from a client, it typically loads the corresponding data from disk into memory (and/or cache) and then reads it from the memory to the client. In a conventional system, reading out all of the virtual machines (or other files that have identical data) to requesting clients typically requires loading a virtual machine from storage into memory and then flushing the memory before loading the next virtual machine from storage. Since loading from storage is usually much slower than simply reading out of memory, such a process can take a significant amount of time. According to embodiments of the invention, however, this process can be performed more quickly. In particular, the storage system loads a virtual machine into memory after receiving a read request. Upon receiving a subsequent read request for a different virtual machine, the storage system can use hash recipes or inodes (already in memory) to identify data previously loaded into memory that is also used by the second virtual machine. Consequently, the storage system only needs to load data into memory that is not already there.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for globally de-duplicating data inline in a shared architecture, the method comprising:
    receiving a digital sequence for storage on a first storage system in a network that includes the first storage system and one or more additional storage systems, wherein the first storage system and each of the one or more additional storage systems include a de-duplication client, wherein the first storage system includes original data and at least a snapshot of the original data;
    determining that the digital sequence includes at least one block of data that is not stored in the first storage system by the de-duplication client of the first storage system;
    determining that the at least one block of data is a duplicate of a block of data already stored on one of the one or more additional storage systems, wherein the de-duplication client of the first storage system is operable to facilitate the making of the determination that the at least one block of data is a duplicate of a block of data already stored on one of the one or more additional storage systems; and
    storing, on the first storage system, a pointer or reference that points to the block of data already stored on the one of the one or more additional storage systems, wherein the at least one block of data is not stored on the first storage system, wherein a single instance of the at least one block of data is used for the original data and the snapshot in the first storage system and in the one or more additional storage systems.

2. The method of claim 1, wherein the storage systems implement copy-on-write to generate snapshots of original data, a WAFL file system, or a combination of copy-on-write and a WAFL file system.

3. The method of claim 1, wherein the first storage system implements a WAFL file system to generate snapshots of original data stored on the first storage system by copying a root inode of the first storage system to create snapshot inodes, the root inode and snapshot inodes each pointing to one or more file inodes and one or more data blocks.

4. The method of claim 3, wherein storing a pointer or reference that points to the block of data already stored on the one of the one or more additional storage systems comprises modifying one or more of the root inode, a snapshot inode, and a file inode to point to the block of data already stored on the one of the one or more additional storage systems.

5. The method of claim 1, wherein determining that the at least one block of data is a duplicate of a block of data already stored on one of the one or more additional storage systems comprises:
    breaking the digital sequence into a plurality of blocks of data that include the at least one block of data;

performing a hash function on the at least one block of data to obtain a hash value of the at least one block of data;

querying a de-duplication server with the hash value of the at least one block of data; and receiving a response from the de-duplication server indicating that the at least one block of data is a duplicate of the block of data already stored on the one of the one or more additional storage systems and identifying a location of the block of data already stored on the one of the one or more additional storage systems.

6. The method of claim 1, further comprising:

determining that the digital sequence includes one or more blocks of data that are duplicates of one or more blocks of data already stored on the first storage system; and storing one or more pointers or references that point to the one or more blocks of data already stored on the first storage system such that the duplicate one or more blocks of data need not be stored again on the first storage system.

7. The method of claim 1, wherein each of the storage systems comprises a file server, a filer, or a storage array.

8. The method of claim 1, wherein the de-duplication client of the first storage system is operable to cooperate with a de-duplication server to determine that the at least one block of data is a duplicate of a block of data already stored on one of the one or more additional storage systems.

9. A method for globally de-duplicating data post-process in a shared architecture, the method comprising:

storing a digital sequence on a first storage system in a network that includes the first storage system and one or more additional storage systems, wherein each of the first storage system and the one or more additional storage systems include a de-duplication client, wherein the first storage system includes original data and at least a snapshot of the original data;

determining that the digital sequence includes at least one block of data that is not already stored in the first storage system by the de-duplication client of the first storage system;

determining that the at least one block of data is a duplicate of a block of data stored on one of the one or more additional storage systems, wherein the de-duplication client of the first storage system is operable to facilitate the making of the determination that the at least one block of data is a duplicate of a block of data already stored on one of the one or more additional storage systems;

deleting the at least one block of data from the first storage system; and storing, on the first storage system, a pointer or reference that points to the block of data stored on the one of the one or more additional storage systems, wherein a single instance of the at least one block of data is used for the original data and the snapshot in the first storage system.

10. The method of claim 9, wherein the first storage system implements a WAFL file system to generate snapshots of original data stored on the first storage system by copying a root inode of the first storage system to create snapshot inodes, the root inode and snapshot inodes each pointing to one or more file inodes and one or more data blocks.

11. The method of claim 10, wherein storing a pointer or reference that points to the block of data stored on the one of the one or more additional storage systems comprises modifying one or more of the root inode, a snapshot inode, and a file inode to point to the block of data stored on the one of the one or more additional storage systems.

12. The method of claim 9, wherein the storage systems implement copy-on-write to generate snapshots of original data stored on the storage systems, a WAFL file system, or a combination of copy-on-write and a WAFL file system.

13. The method of claim 9, wherein determining that the at least one block of data is a duplicate of a block of data stored on one of the one or more additional storage systems comprises:

breaking the digital sequence into a plurality of blocks of data that include the at least one block of data;

performing a hash function on the at least one block of data to obtain a hash value of the at least one block of data;

querying a de-duplication server with the hash value of the at least one block of data; and receiving a response from the de-duplication server indicating that the at least one block of data is a duplicate of the block of data stored on the one of the one or more additional storage systems and identifying a location of the block of data stored on the one of the one or more additional storage systems.

14. The method of claim 9, wherein each of the storage systems comprises a file server, a filer, or a storage array.

15. The method of claim 9, further comprising:

determining that the digital sequence includes one or more blocks of data that are duplicates of one or more blocks of data already stored on the first storage system;

deleting the one or more blocks of data from the first storage system; and storing one or more pointers or references that point to the one or more blocks of data already stored on the first storage system such that the duplicate one or more blocks of data need not be stored again on the first storage system.

16. In a shared architecture that includes first and second storage systems configured to communication with each other by way of a network, a method for globally de-duplicating data in the shared architecture, the method comprising:

receiving information from the first storage system and from the second storage system;

populating a hash table with the information received from the first storage system and from the second storage system;

receiving a query from the first storage system that includes a hash value corresponding to at least one block of data that is not stored at the first storage system;

checking the hash table to see if the hash value is present in the hash table; and if the hash value is present in the hash table, transmitting to the first storage system an indication that the at least one block of data is a duplicate of a block of data stored elsewhere in the shared architecture, and the indication identifying a location of the block of data.

17. The method as recited in claim 16, wherein if the hash value is not present in the hash table, the method further includes transmitting an indication to the first storage system that the at least one block of data is new.

18. A de-duplication server configured to perform the method as recited in claim 16.

19. A storage system having a de-duplication client configured to perform the method as recited in claim 16.

20. The method as recited in claim 16, wherein the method is operable to de-duplicate data inline.

* * * * *